(12) United States Patent
Chao

(10) Patent No.: US 6,184,864 B1
(45) Date of Patent: Feb. 6, 2001

(54) DIGITIZER TABLET APPARATUS WITH EDGE AREA AS A MACRO CELL

(75) Inventor: Ching-Chuan Chao, Taipei Hsien (TW)

(73) Assignee: AIPTEK International Inc., Hsinchu (TW)

( * ) Notice: Under 35 U.S.C. 154(b), the term of this patent shall be extended for 0 days.

(21) Appl. No.: 09/074,505

(22) Filed: May 7, 1998

(51) Int. Cl.[7] .................................................. G09G 5/08
(52) U.S. Cl. ........................ 345/157; 345/173; 345/169; 340/706
(58) Field of Search ...................... 345/173, 176, 345/179, 157, 169, 100, 126, 905; 178/18.01, 18.03, 18.05, 18.06, 18.07, 19.01, 19.02, 19.03, 19.04, 19.05, 20.01; 340/706, 707, 709, 710

(56) References Cited

U.S. PATENT DOCUMENTS

| | | | |
|---|---|---|---|
| 4,198,539 | * 4/1980 | Pepper, Jr. ............................. 178/18 |
| 4,302,011 | * 11/1981 | Pepper, Jr. ............................. 178/18 |
| 5,406,307 | * 4/1995 | Hirayama et al. ..................... 345/179 |
| 5,861,886 | * 1/1999 | Moran et al. .......................... 345/179 |
| 5,870,092 | * 4/1999 | Bedford-Robert .................... 345/173 |
| 5,949,408 | * 9/1999 | Kang et al. ............................ 345/179 |

* cited by examiner

*Primary Examiner*—Vijay Shankar
*Assistant Examiner*—Mansour M. Said

(57) ABSTRACT

A digitizer tablet apparatus uses edge areas on the surface of the apparatus as macro cell areas. The location of a pointing device in the apparatus is determined from a plurality of detected magnetic voltages. Threshold values are used to determine if the pointing device is in an edge area. A macro cell in an edge area may be a relative precise macro cell or a coarse macro cell. When a pointing device is in an edge area, the detected voltages may not provide enough data for determining the exact location of the pointing device. If only the exact location in X direction or Y direction can not be determined, the macro cell selected by the pointing device is a relative precise macro cell. If the exact location in both X direction and Y direction can not be determined, the macro cell is a coarse macro cell.

5 Claims, 12 Drawing Sheets

DIGITIZER TABLET APPARATUS WITH EDGE AREA AS A MACRO CELL

FIELD OF THE INVENTION

The present invention relates generally to digitizer systems for providing inputs to a computer and, more particularly, to a digitizing tablet system in which the edge area on the surface of a tablet is used as a macro cell area for either a cursor device or a stylus device. It can be used for computer aided design units or computer aided manufacturing units, such as graphics tablets, word processor, video editor, entertainment devices (video game machines), and so on. A macro cell is referred to as special function capable of performing a fixed or a programmable task.

BACKGROUND OF THE INVENTION

Early computers could only be used by persons trained in operating them. With the advent of so-called "personal computers", however, virtually everyone may have an access to a computer. To make computers more user friendly, various input devices have been introduced in different computer systems. The major popular "pointing" input device was a cursor device (such as a mouse) or a stylus device (such as a pen) for a digitizing tablet system.

A typical prior art digitizer has a tablet and a transducer/cursor in the form of a pen or a puck. To determine the general position of a transducer/cursor on the surface in an electromagnetic digitizer tablet, various methods are employed in the prior art. One common approach uses electromagnetic field sensing. In this approach, several magnetic loops (as shown in FIG. 1) are used to detect magnetic voltages, and the magnetic loops are sampled by an analog-to-digital converter under the control of a micro controller.

As we can see in FIG. 1, for a general position P of a transducer/cursor on the surface of an electromagnetic digitizer tablet, Five magnetic loops are sampled in X direction and Y direction respectively. These samples are labeled as ax, bx, . . . , ex, and ay, by, . . . , ey for X-direction and Y-direction respectively.

In this approach, assuming that the detected magnetic voltages for these samples ax, bx, . . . , ex, and ay, by, . . . , ey are Vax, Vbx, . . . , Vex, and Vay, Vby, . . . , Vey respectively, then the general position in X-direction Px would be a function of Vax, Vbx, . . . , Vex, and that in Y-direction would be a function of Vay, Vby, . . . , Vey. In other words, a general position P of a transducer/cursor on the surface of an electric magnetic digitizer tablet can be determined after the magnetic voltages are detected for these samples.

FIG. 2 illustrates a tablet coordinate system comprising many magnetic detecting loops of FIG. 1 in X-direction and Y-direction respectively. As those skilled in the art can readily recognize and appreciate, the foregoing approach could provide a position for a "pen" type or "puck" type of transducer/cursor device located in the general working area of a digitizer tablet. Unfortunately, the edge area on the surface of the tablet is an ambiguous area, no sufficient sensing voltage can be used as the formula parameter to determine the position of the edge areas (as shown in FIG. 3) on the surface of the tablet. Thus, the edge areas are wasted and not used.

FIG. 4 illustrates a simplified top view of a prior art digitizer tablet. In a conventional digitizer tablet, special functions performed for a digitizer tablet are made through menu selections which can be entered from a keyboard if desired. Nevertheless, it would be easier and more user friendly if the menu selections can be made using a "pen" type or "puck" type of transducer/cursor device.

One approach to using a digitizing tablet system combines menu and working area designations within the active area on the surface of the tablet system. This approach could provide some benefits to certain menu-driven application programs. However, there are several factors working against such uses. The primary one is cost. Another factor is that the software necessary for interfacing with other menu-driven applications may not be available.

Another approach for a user to use his cursor device on a digitizing tablet system in a manner of a mouse is the application of a mouse emulation program. In such an approach, users do not have to switch between a mouse and a tablet system. However, the emulation programs do not appear to satisfactorily emulate a mouse. Therefore, most users do use both devices depending on which device the program being used expects as its input device.

From the foregoing discussions, it can be seen that the conventional approaches have drawbacks. It is inefficient for an electromagnetic digitizer tablet system using a "pen" type or "puck" type of transducer/cursor device for providing inputs to a computer system to expand the tablet capability. There exists a strong need for having a more efficient approach for a digitizer tablet system to utilize its edge area so that the digitizer tablet system can operate more functionally on its tablet, and the edge areas of the tablet are not wasted.

SUMMARY OF THE INVENSION

This invention has been made to overcome the above mentioned drawbacks and inefficiencies of an electromagnetic digitizer tablet system. The primary object of the present invention is to provide a digitizer tablet apparatus which expands its tablet capability by utilizing the edge area on the surface of the tablet system as a macro cell area.

In accomplishing that object, it is another object to provide a macro cell area principle to determine which position a pointing device, either a "pen" type or a "puck" type of transducer/cursor device, is located in the edge areas shown in FIG. 3, and it assures that the pointing device is near the surface of a tablet to avoid the environment noise interference in a digitizer tablet apparatus.

It is a further object of the invention to provide a principle that can supply the macro cell areas on the surface of a tablet with both a coarse coordinate system and a relative precise coordinate system whereby the user can have more selections through the macro cell areas.

Still another object of the present invention is to provide such a digitizer tablet apparatus which has a small size and low price.

The foregoing and other objects, features, aspects and advantages of the present invention will become more apparent from the detailed description provided herein below, with appropriate reference to the accompanying drawings.

DETAILED DESCRIPTION OF THE PREFERRED EMBODIMENTS

Figure 5:
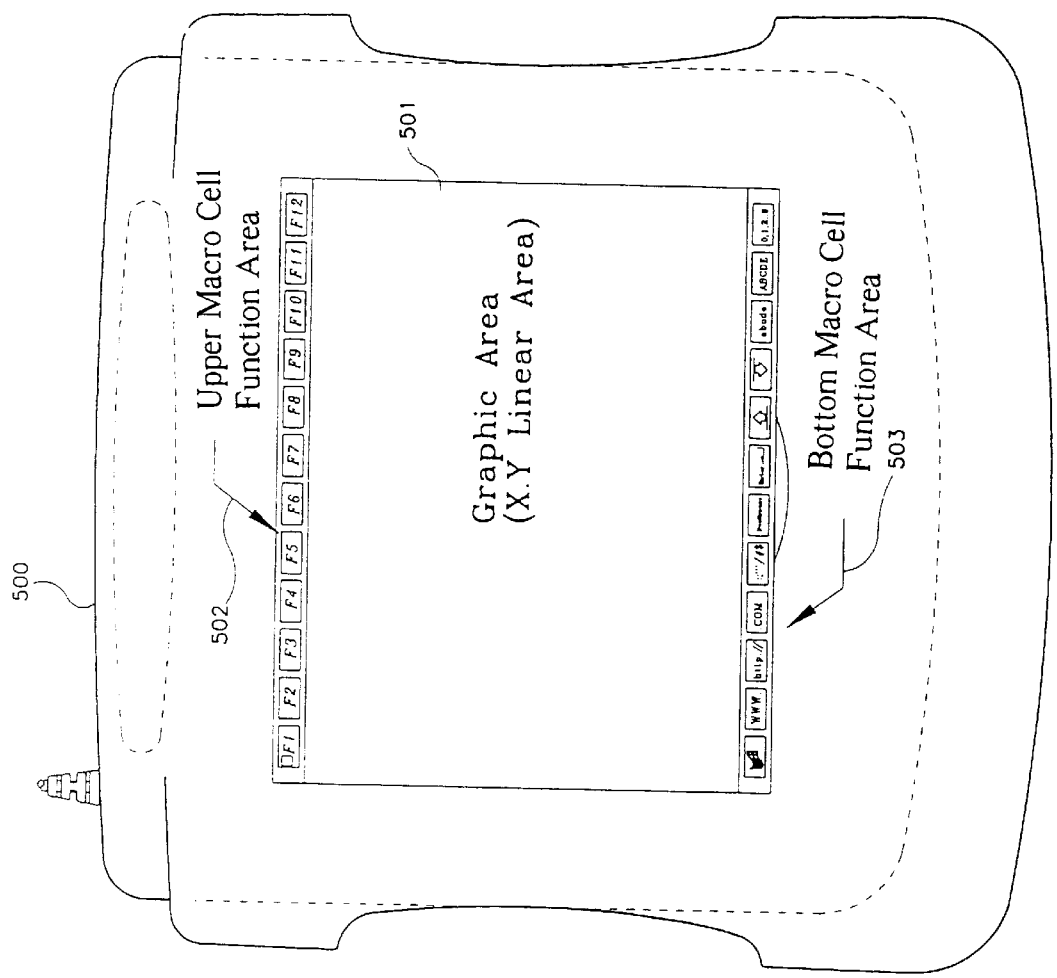
FIG. 5 illustrates a top view of a digitizer tablet employed in the preferred embodiment of the present invention.

With reference to FIG. 5, there is shown a digitizer tablet employed in a preferred embodiment of the present invention. In the embodiment, the digitizer tablet 500 comprises a graphic area 501, an upper macro cell function area 502 and a bottom macro cell function area 503. Numerous macro cell functions are provided and located at top and bottom edges of the tablet as shown in FIG. 5.

To make a selection of a macro cell function, the user uses the pen and moves close to the heading containing the desired macro cell area. The information associated with the selected heading is then sent to the computer when the pen tip touches a macro cell function. The computer receives the information and implements the selection by a predefined action. When the action is completed, it allows the user to further use a macro cell function on the macro cell function area in its normal manner.

Figure 6:
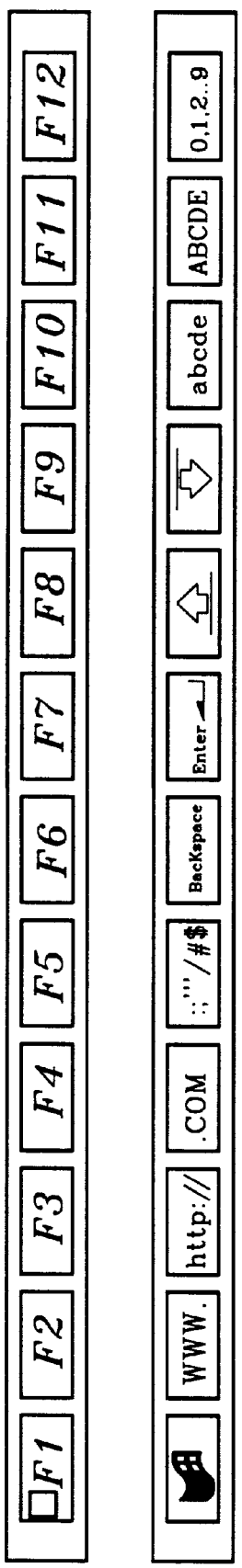
FIG. 6 illustrates an example of employing the edge area of FIG. 5 as a macro cell area.

FIG. 6 illustrates an example of employing the edge area of FIG. 5 as a macro cell area. In the design of FIG. 6, if an F1 macro cell is touched and the message associated with the F1 heading is sent to the computer, the computer acts as if an F1 function key has been entered through the keyboard.

Another example can be described as follows If a "012 . . . 9" macro cell is touched and the message associated with the "012 . . . 9" heading is sent to the computer, the computer opens a window and displays 0 to 9 numeric keys on the screen of the window. When the user further uses a pen cursor to touch a numeric key in the window, the computer acts as if a numeric key has been entered through the keyboard.

Figure 3:
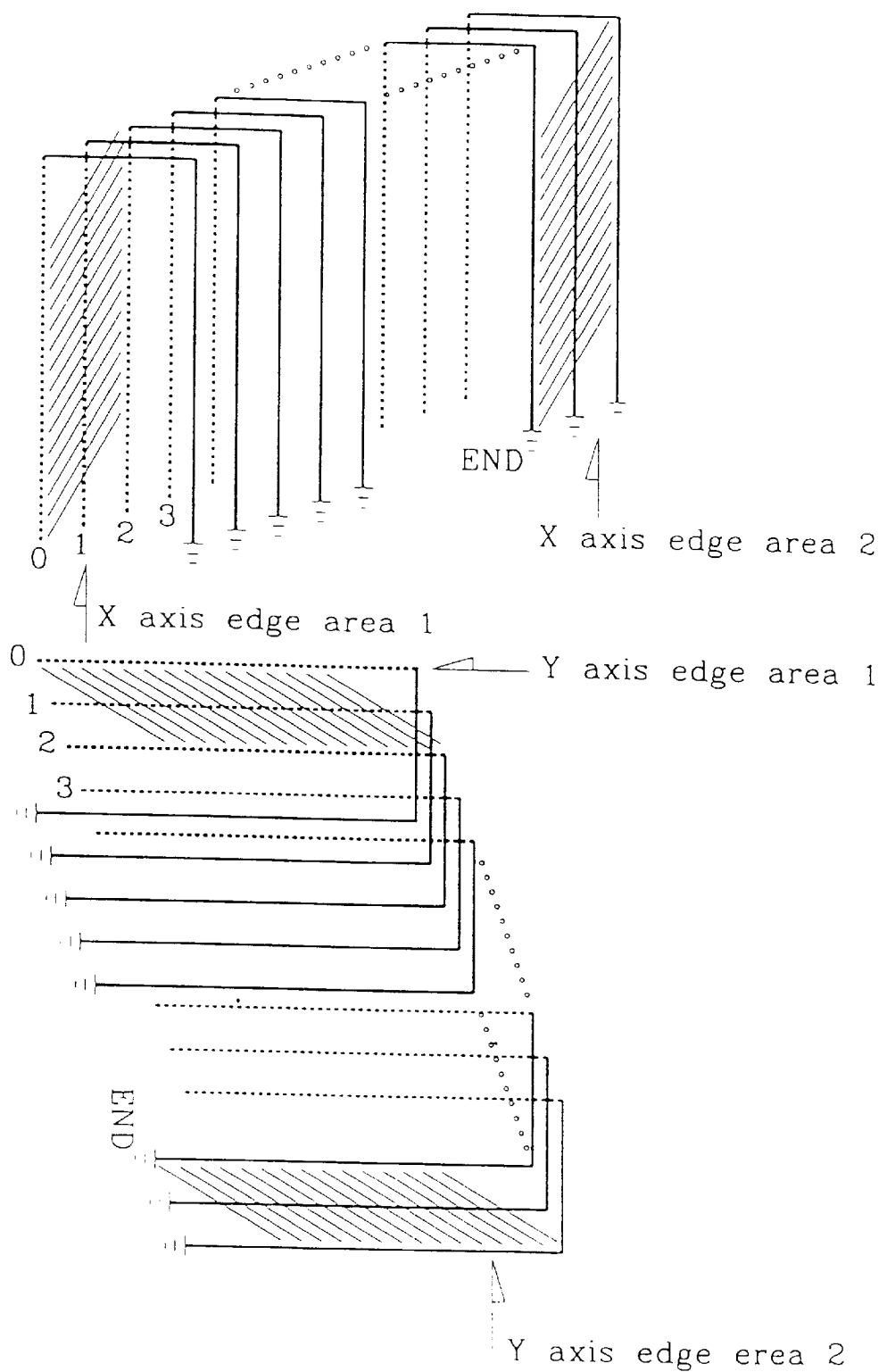
FIG. 3 illustrates the edge areas on the surface of a tablet in a tablet coordinate system of FIG. 2.
Figure 4:
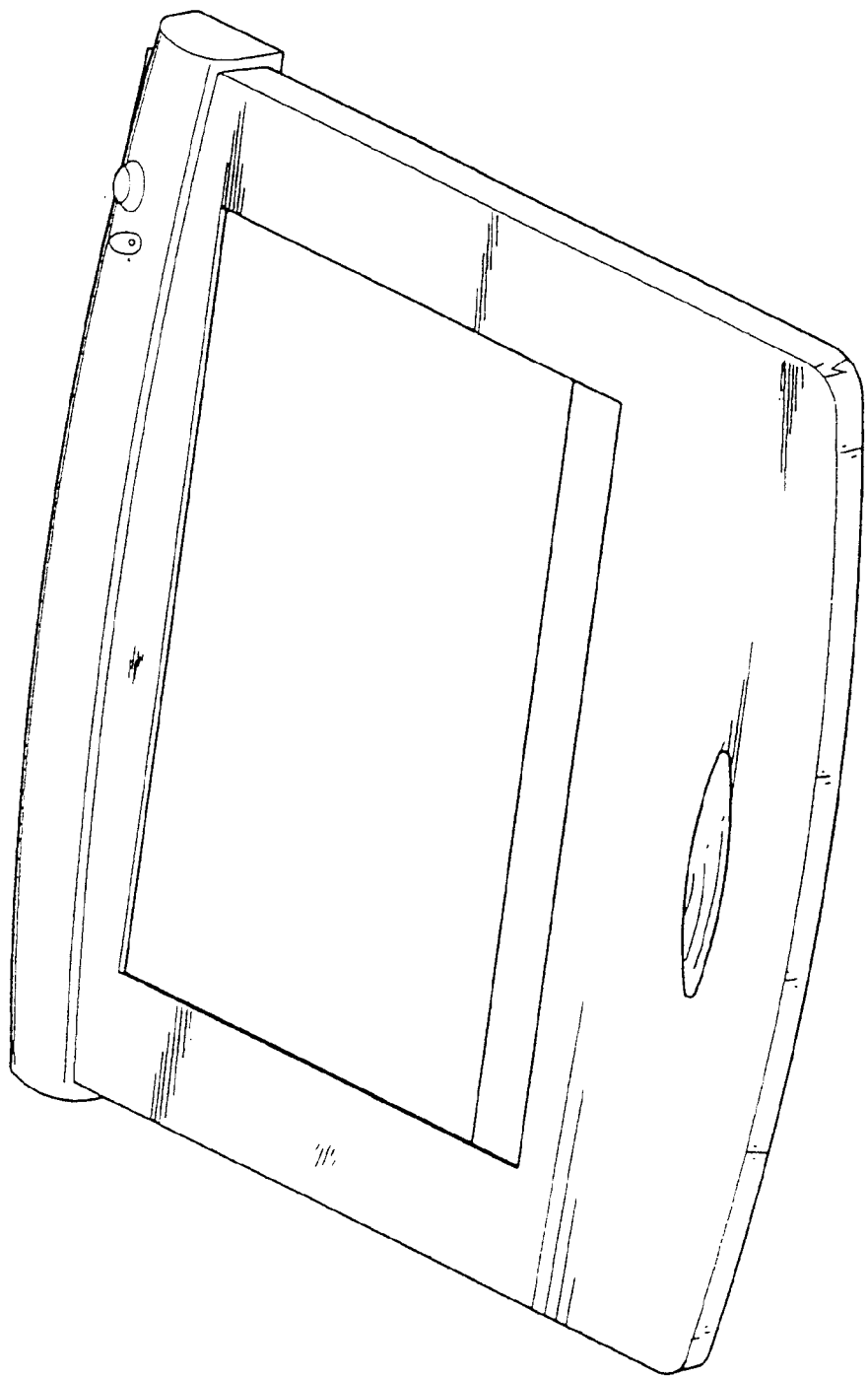
FIG. 4 illustrates a simplified top view of a prior art digitizer tablet.

The major principle of using the edge area on the surface of a digitizer tablet of the present invention as a macro cell area is now described in detail. As mentioned earlier, because the edge area on the surface of a tablet is an ambiguous area, there are not enough sensing voltages for determining Px and Py of the position. However, when a pen (stylus) or a cursor (puck) is located at the edge area as shown in FIG. 3, the sensing voltage has the following characteristics:

Vax>Vbx>Vcx>Vdx>Vex or Vay>Vby>Vcy>Vdy>Vey.

Figure 2:
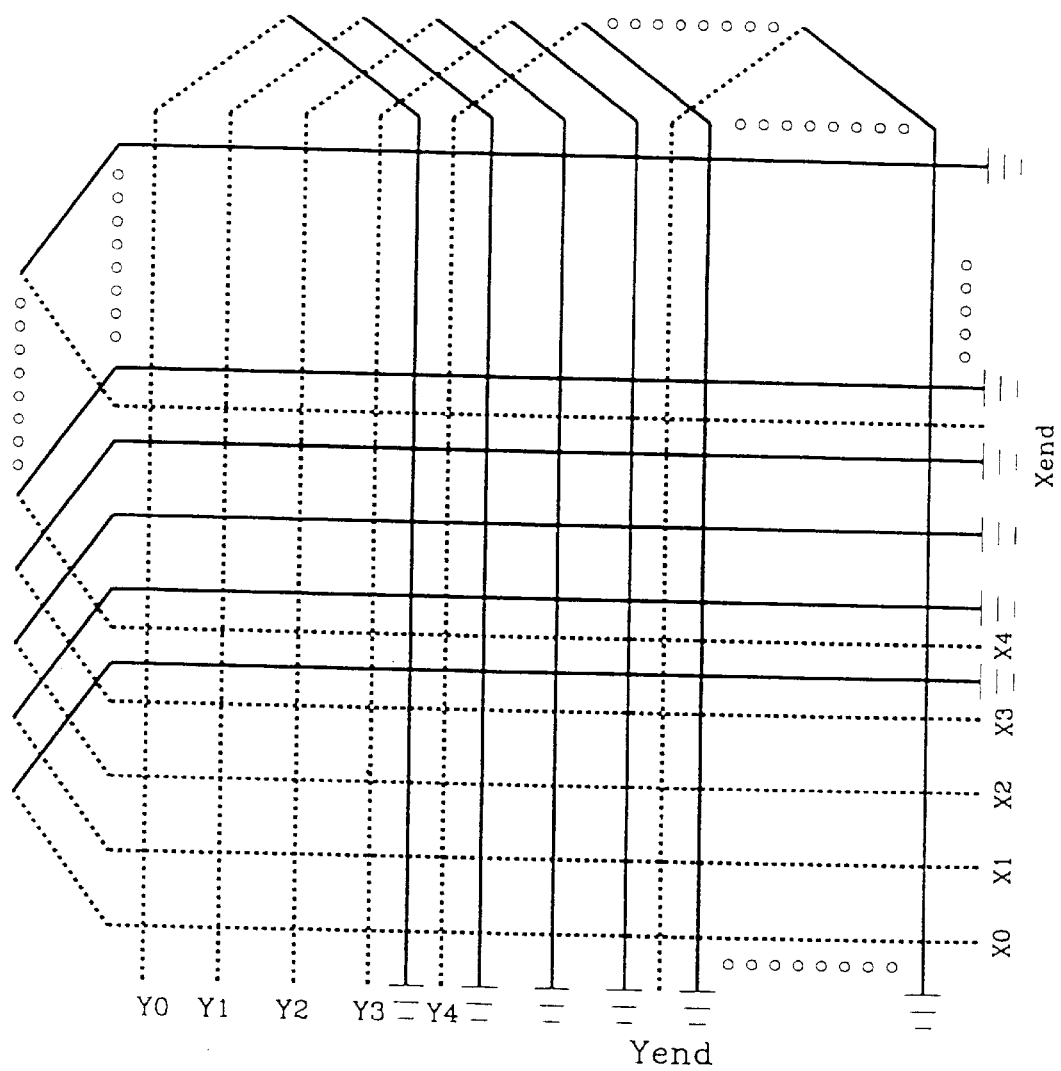
FIG. 2 illustrates a tablet coordinate system having many magnetic detecting loops of FIG. 1 in X-direction and Y-direction respectively.

Therefore, in a continuous coordinate system as shown in FIG. 2, if we find that the sensing voltage has a maximum voltage in the edge loop, such as Vx0, Vxend, Vy0 and Vyend, we can determine that the pointing device is located at the edge area X0, Xend, Y0 or Yend.

When a pointing device is placed on the surface of the edge area, one or two of Vx0, Vxend, Vy0 and Vyend have maximum sensing voltage. To determine the location of the macro cell associated with the selection of the pointing device, the following one or two conditions should be satisfied:

Vx0, Vxend, Vy0, Vyend>threshold voltage for Vedge, and

Vx1, Vxend-1, Vy1, Vyend-1>threshold voltage for Vedge1, wherein Vedge is one of Vx0, Vxend, Vy0 and Vyend, and Vedge1 is one of Vx1, Vxend-1, Vy1 and Vyend-1.

The sensing voltage in a detecting loop center has a maximum value and the sensing voltage in the edge area of a detecting loop has a smaller value.

In the steps of attaining the threshold voltage for Vedge or Vedge1, there are three determining factors, the proximity height referred as factor1, the environment noise immunity referred as factor2 and the width of the edge area referred as factor3. The proximity height is the distance from the surface of the tablet to the detectable location of the pointing device. The environment noise immunity is the immunity from the environment noise including frequency detecting error tolerance, product adjustable tolerance, environment change induced frequency change and so on. The width of the edge area is the width of the edge area shown in FIG. 3.

For the factor1, the larger the threshold voltage for Vedge (Vedge1) is, the lower the proximity height is. For the factor2, the larger the threshold voltage for Vedge (Vedge1) is, the higher the environment noise immunity is. For the factor3, the larger the threshold voltage for Vedge (Vedge1) is, the smaller the width of the edge area is.

Figure 7A:
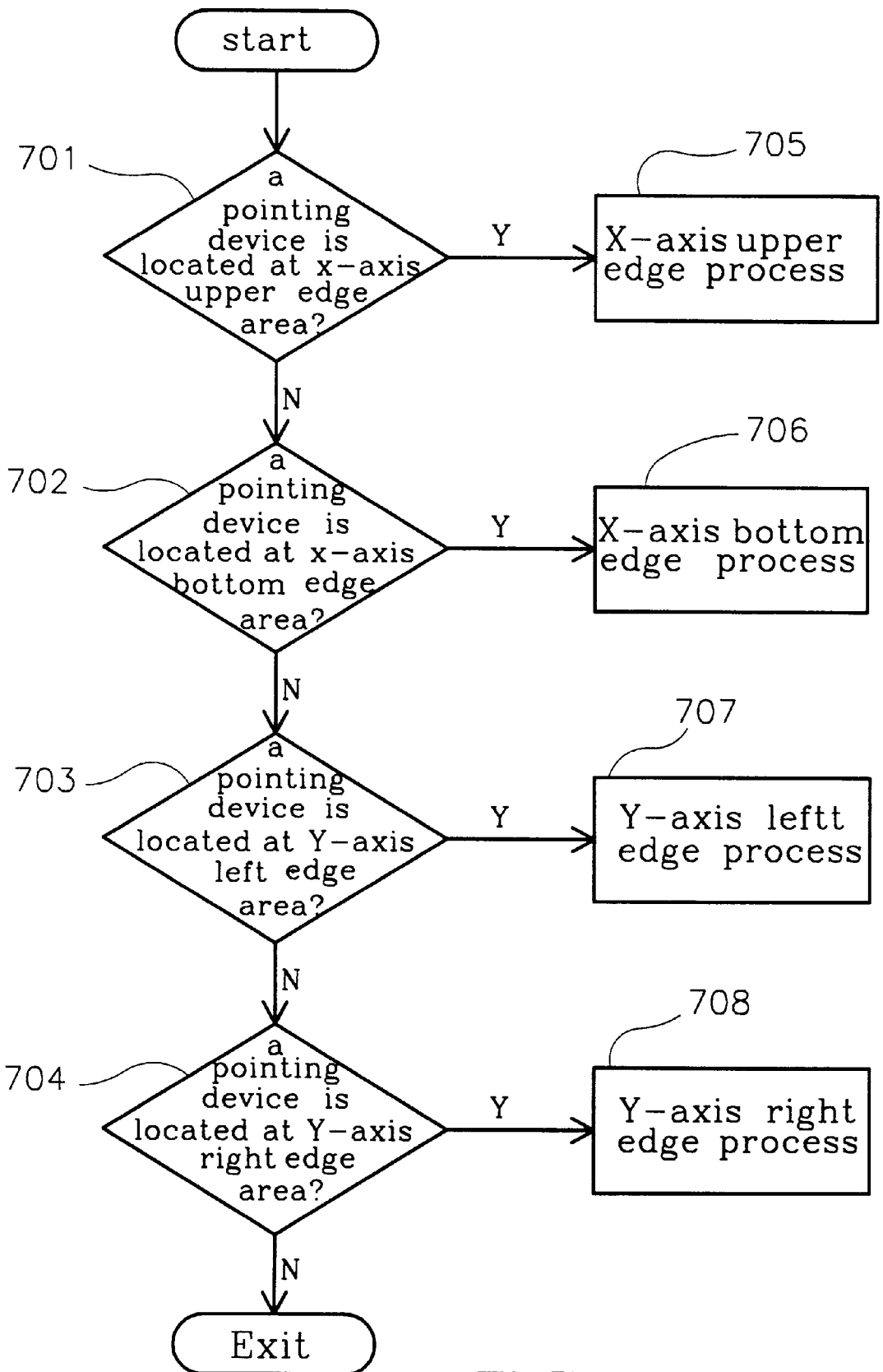
FIGS. 7A–7B comprise flow diagrams illustrating the general steps taken by the macro cell area principle according to the present invention.
Figure 7B:
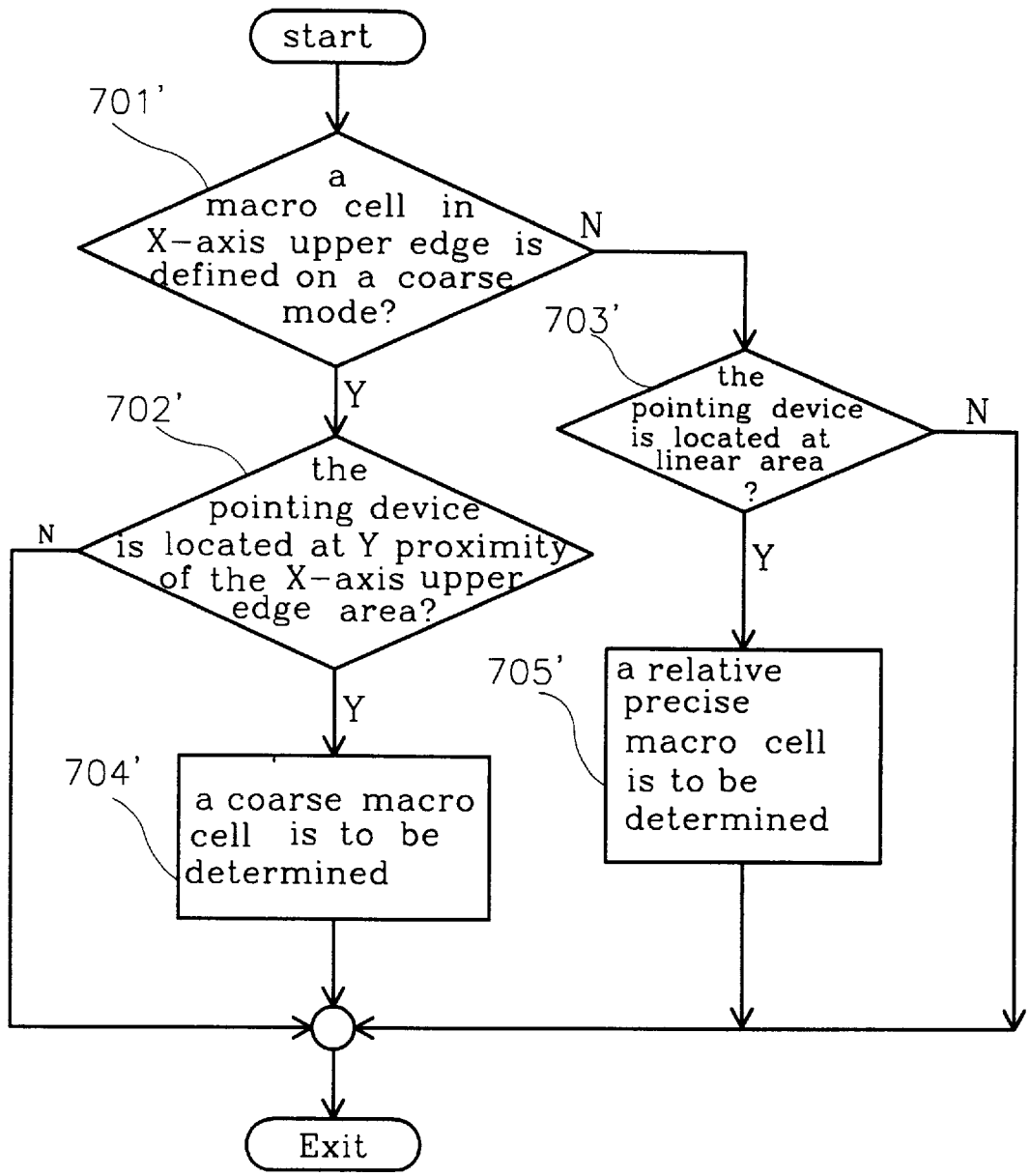

FIGS. 7A–7B comprise flow diagrams illustrating the general steps taken by the macro cell area principle according to the present invention.

To determine a macro cell area, which edge area the pointing device is located is first checked (steps 701–704). As shown in FIG. 7A, a pointing device can be located at one or two of the four edge areas, i.e., X-axis upper edge area, X-axis bottom edge area, Y-axis left edge area and Y-axis right edge area. Having determined the edge area where the pointing device is located, a second process is taken as shown in steps 705–708. The second process is described with reference to FIG. 7B assuming that the pointing device is located at the X-axis upper edge area.

A macro cell area can be a combination of X-axis edge area and Y-axis linear area, Y-axis edge area and X-axis linear area, or X-axis edge area and Y-axis edge area. According to the present invention, a macro cell can be either a coarse macro cell or a relative precise macro cell dependent on where it is located. If a sequence of macro cells can be determined directly by the tablet coordinate system formed by the detecting loops, it is simpler by designing them as coarse macro cells. Otherwise, it can be accomplished by designing them as relative precise macro cells.

For a relative precise macro cell, it needs to take special care on the layout of the linear part of the edge area of a digitizer tablet. More detecting layout space is necessary to make a "pen" type or "puck" type of pointing device on the detecting loops have more uniform magnetic sensing field, so that the linear position of the relative precise macro cell can be computed. Whereby a user can have more precise selections through the relative precise macro cell areas.

Figure 1:
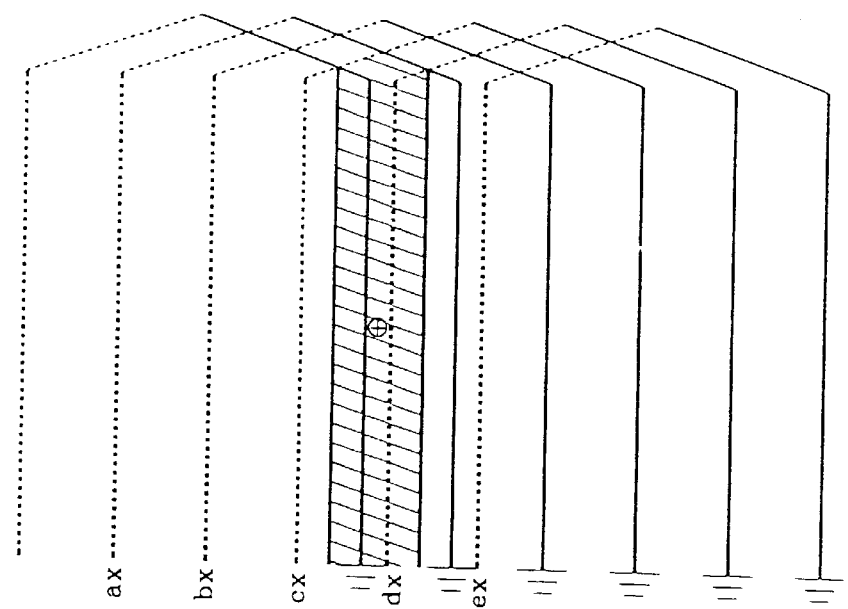
FIG. 1 illustrates five sampled magnetic loops which are used to detect magnetic voltages for determining which position a pointing device is located in general working areas of a digitizer tablet system by a conventional approach.
Figure 1:
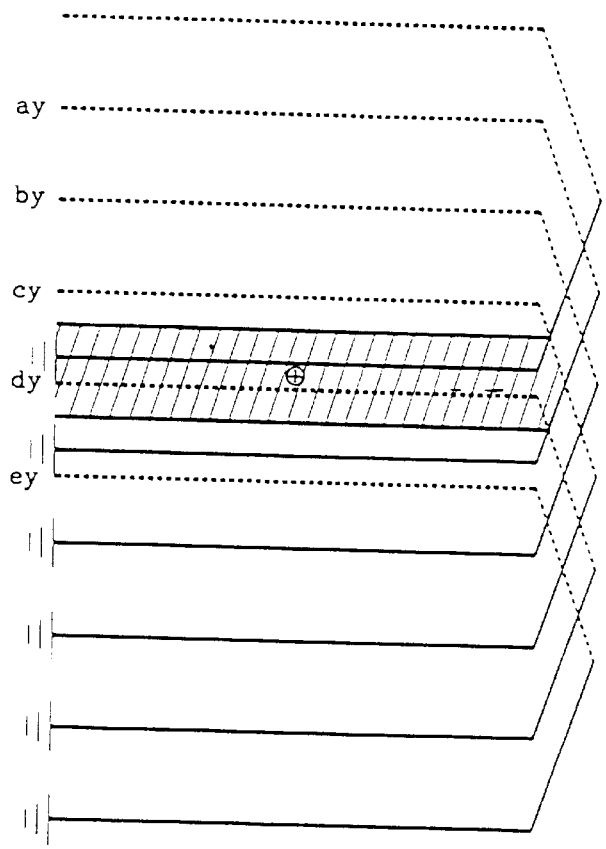

As described earlier, the position of a pointing device can be determined by the detected magnetic voltages near the pointing device at ax, bx, cx, . . . , ex and ay, by, cy, . . . , ey for X-direction and Y-direction respectively as shown in the prior art of FIG. 1. Furthermore, when a pointing device is located in an edge area as shown in FIG. 3, the detected magnetic voltages satisfy conditions such as Vax>Vbx>Vcx>Vdx>Vex or Vay>Vby>Vcy>Vdy>Vey.

According to this invention, when the pointing device is located near edge areas, the detected magnetic voltages may not provide adequate information for determining the exact location of the pointing device in X-direction or Y-direction. If tile exact location can not be determined in X-direction, a macro cell number where the pointing device is located may be determined in X-direction. If the exact location can not be determined in Y-direction, a macro cell number where the pointing device is located may be determined in Y-direction. In some positions, only the macro cell number can be determined in both X-direction and Y-direction.

Accordingly, in the digitizer tablet apparatus of the invention, macro cells are defined in the edge area where the exact location of the pointing device in X-direction or Y-direction can not be determined. The macro cells are further categorized as either relative precise macro cells or coarse macro cells. For a macro cell, if the exact location of a pointing device can only be determined in either X-direction or Y-direction by the detected magnetic voltages, the macro cell is defined as a relative precise macro cell. In other words, for a relative precise macro cell, in one axis only the location corresponding to a macro cell number can be determined but in the other axis the exact location can be determined. However, for a coarse macro cell, only the macro cell number corresponding to the macro cell can be determined in both axes.

In the case of FIG. 7B, a macro cell area in X-axis upper edge area defined as a coarse macro cell or a relative precise macro cell is checked at step 701'. If it is defined as a coarse macro cell, then whether the pointing device is located at Y proximity of the X-axis upper edge area is further checked (step 702'). Otherwise, it is defined as a relative precise cell and whether the pointing device is located at the linear area is checked (step 703').

Following step 702', if the pointing device is located at Y proximity of the X-axis upper edge area, then a coarse macro cell is to be determined (step 704'), and it will be described in more detail next with reference to FIGS. 8A and 8B.

Following step 703', if the pointing device is located at linear area, then a relative precise macro cell is to be determined (step 705'), and it will be described in more detail next with reference to FIGS. 9A and 9B.

Figure 8A:
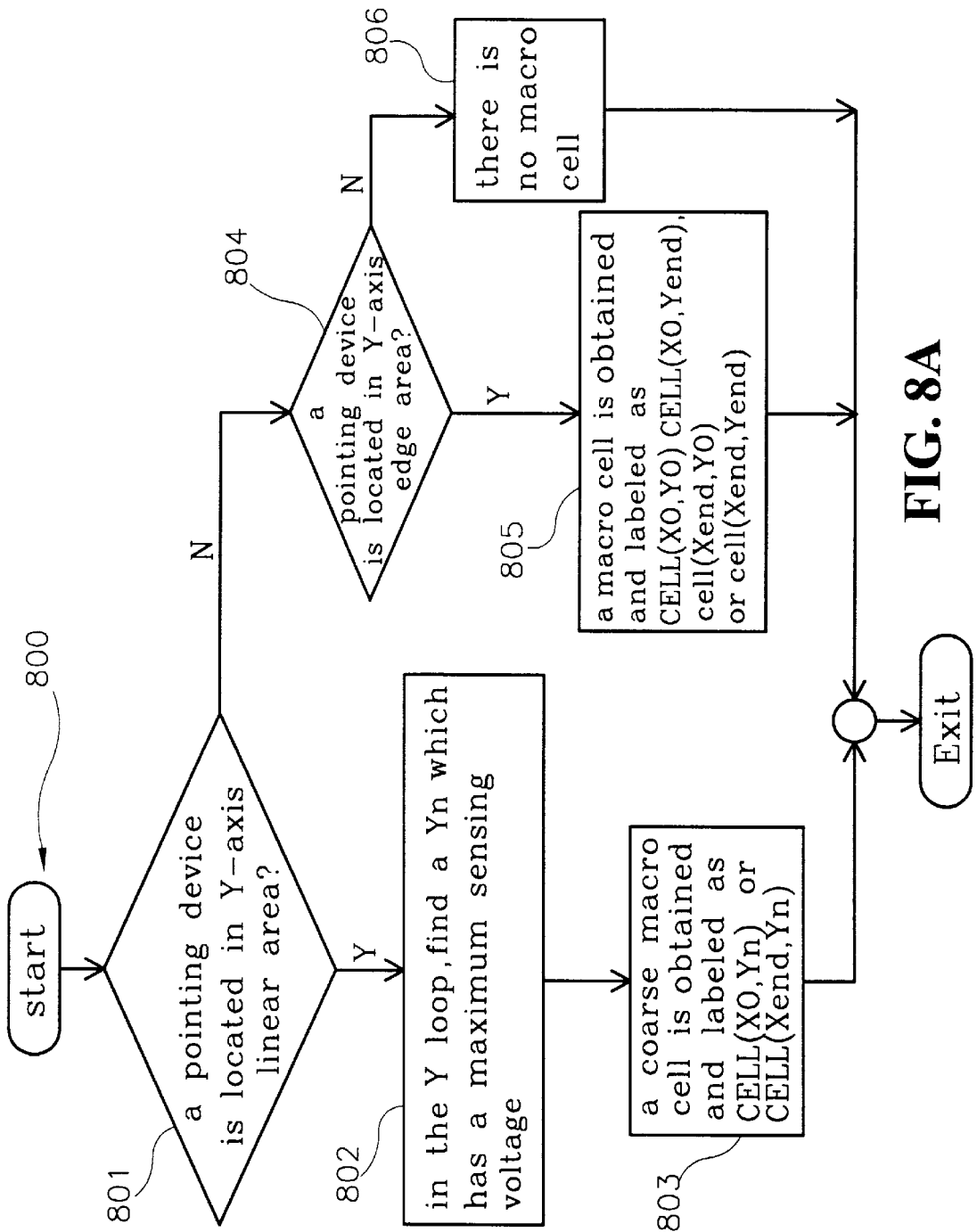
FIGS. 8A–8B comprise flow diagrams illustrating how a coarse macro cell is determined according to the present invention.
Figure 8B:
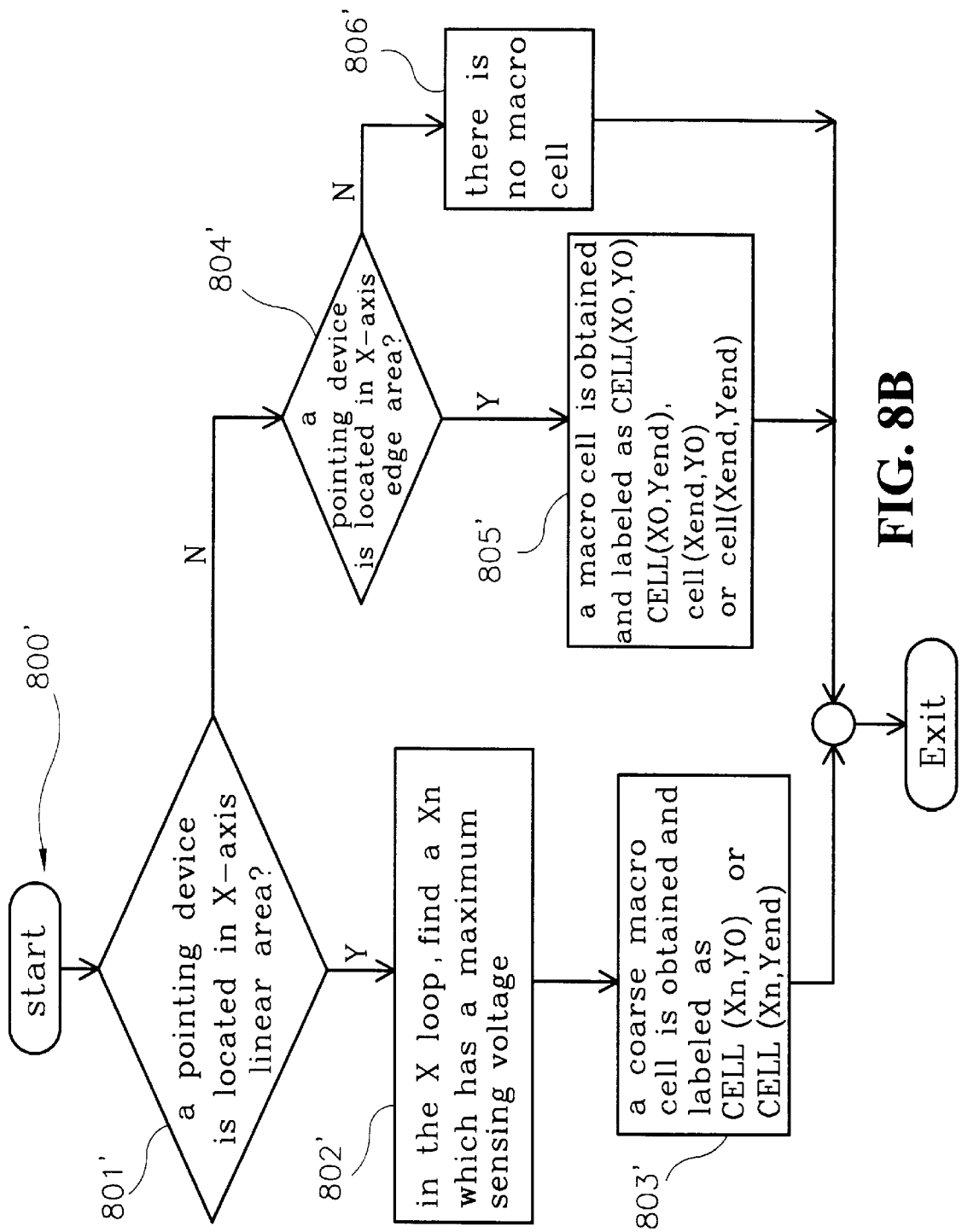

FIGS. 8A–8B and FIGS. 9A–9B illustrate the flow diagrams in which a coarse macro cell and a relative precise macro cell are determined respectively. With reference to FIGS. 8A–8B, a coarse macro cell is determined by the following steps:

(i) For a pointing device which is located in the X-axis edge area X0 or Xend, as shown in step 800 of the FIG. 8A, whether a pointing device is located in the Y-axis linear area is first checked at step 801. If the pointing device is in the Y-axis linear area, then it keeps on finding a Yn which has a maximum sensing voltage in the Y-axis loop (step 802). After finding such Yn, a coarse macro cell is obtained and labeled as CELL(X0,Yn) or CELL(Xend, Yn) (step 803). Following the step 801, if the pointing device is not in the Y-axis linear area, then whether a pointing device is located in the Y-axis edge area is checked at step 805. If the checking result is negative, then there is no macro cell (step 806). Otherwise, a coarse macro cell is obtained and labeled as CELL(X0,Y0), CELL(X0,Yend), CELL(Xend,Y0) or CELL(Xend,Yend) (step 805).

(ii) For a pointing device which is located in the Y-axis edge area Y0 or Yend, as shown in step 800' of the FIG. 8B, whether a pointing device is located in the X-axis linear area is first checked at step 801'. If the pointing device is in the X-axis linear area, then it keeps on finding a Xn which has a maximum sensing voltage in the X-axis loop (step 802'). After finding such Xn, a coarse macro cell is obtained and labeled as CELL(Xn,Y0) or CELL(Xn, Yend) (step 803'). Following the step 801', if the pointing device is not in the X-axis linear area, then whether a pointing device is located in the X-axis edge area is checked at step 805'. If the checking result is negative, then there is no macro cell (step 806'). Otherwise, a coarse macro cell is obtained and labeled as CELL(X0,Y0), CELL(X0,Yend), CELL(Xend,Y0) or CELL(Xend,Yend) (step 805').

Figure 9A:
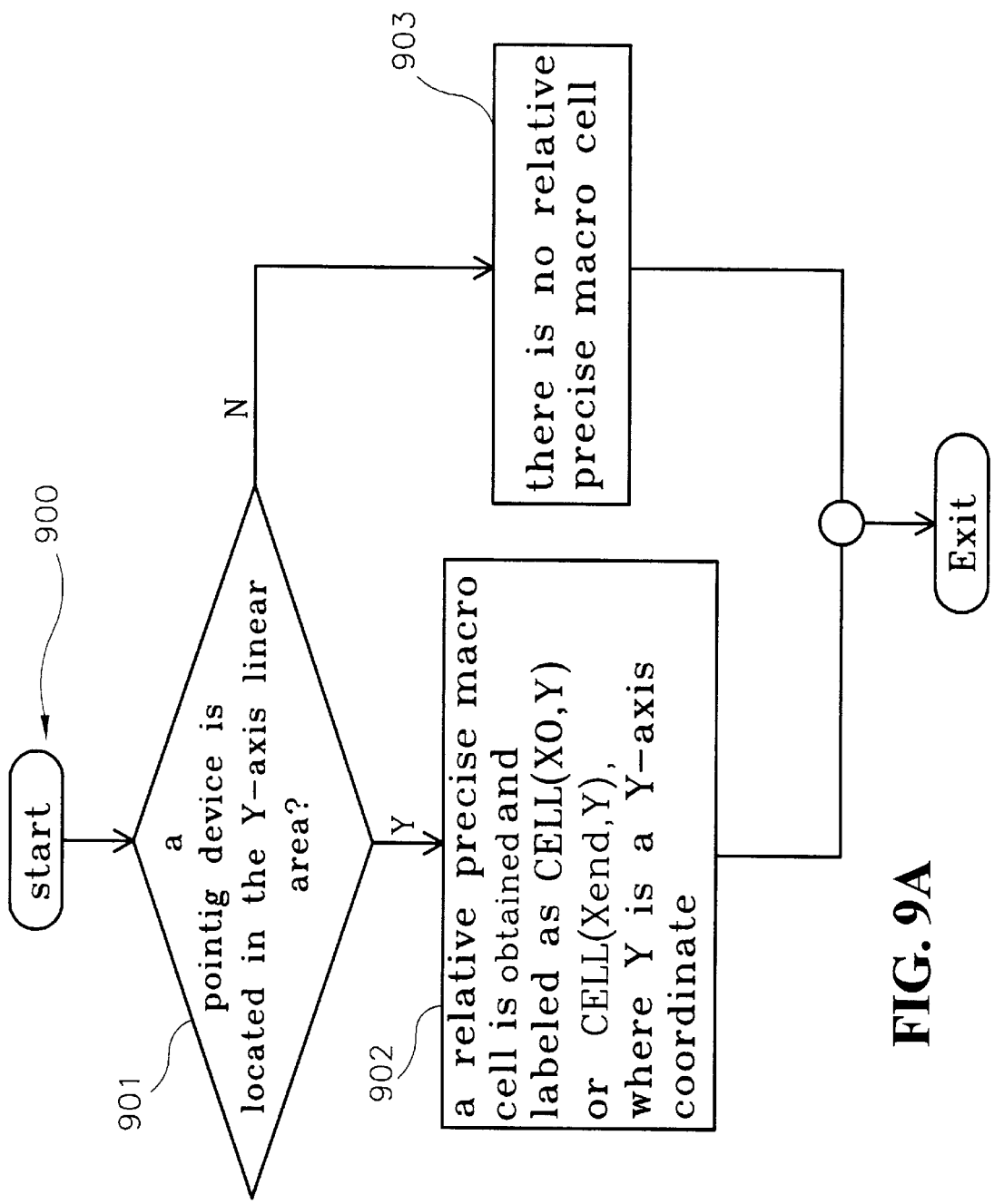
FIGS. 9A–9B comprise flow diagrams illustrating how a relative precise macro cell is determined according to the present invention.
Figure 9B:
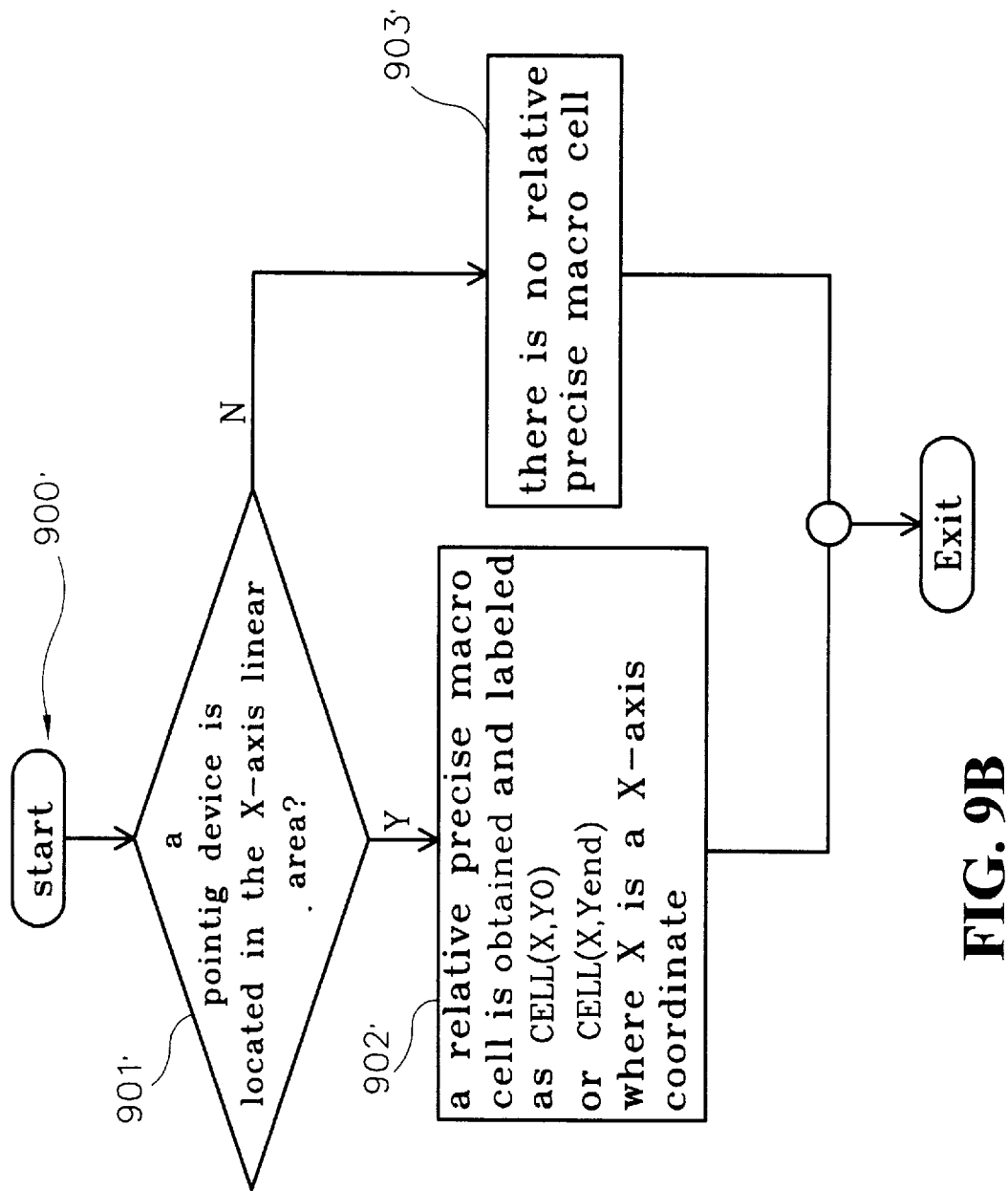

In the design of FIGS. 9A–9B, a relative precise macro cell is determined by the following steps:

(i) For a pointing device which is located in the X-axis edge area X0 or Xend, as shown in step 900 of the FIG. 9A, whether a pointing device is located in the Y-axis linear area is first checked at step 901. If the pointing device is in the Y-axis linear area, then a relative precise macro cell is obtained and labeled as CELL(X0,Y) or CELL(Xend, Y), where Y is a Y-axis coordinate (step 902). Following the step 901, if the pointing device is not in the Y-axis linear area, then there is no relative precise macro cell (step 903).

(ii) For a pointing device which is located in the Y-axis edge area Y0 or Yend, as shown in step 900' of the FIG. 9B, whether a pointing device is located in the X-axis linear area is first checked at step 901'. If the pointing device is in the X-axis linear area, then a precise macro cell is obtained and labeled as CELL(X,Y0) or CELL(X,Yend), where X is an X-axis coordinate (step 902'). Following the step 901', if the pointing device is not in the X-axis linear area, then there is no relative precise macro cell (step 903').

Although this invention has been described with a certain degree of particularity, it is to be understood that the present disclosure has been made by means of preferred embodiments only and that numerous changes in the detailed construction and combination as well as arrangement of parts may be restored to without departing from the spirit and scope of the invention as hereinafter set forth.

What is claimed is:

1. A method for identifying a macro cell selected by a pointing device in an edge area of a digitizer tablet apparatus having magnetic voltage detection loops, comprising the steps of:

a. establishing a tablet coordinate system for said digitizer tablet apparatus, said tablet coordinate system having orthogonal first and second axes;

b. detecting a first plurality of voltages from a first group of said voltage detection loops and a second plurality of voltages from a second group of said voltage detection loops;

c. checking if first and second coordinates where said pointing device is positioned in said edge area along first and second axis directions respectively can be determined from said first and second pluralities of voltages or not;

d. determining if said pointing device is located in a first axis edge area or a second axis edge area from said first and second pluralities of voltages;

e. determining a macro cell number in said second axis direction if said pointing device is determined to be in a first axis edge area and said second coordinate can not be determined, or determining a macro cell number in said first axis direction if said pointing device is determined to be in a second axis edge area and said first coordinate can not be determined; and f. identifying said macro cell as a relative precise macro cell if only one of said first and second coordinates can not be determined; otherwise, identifying said macro cell as a coarse macro cell.

2. The method as claimed in claim 1, wherein said step f. further includes the steps of:

g. identifying said macro cell as a relative precise macro cell if said pointing device is determined to be in a first axis area and said second coordinate can be determined, or identifying said macro cell as a coarse macro cell with a macro cell number if said pointing device is determined to be in a first axis area and said second coordinate can not be determined; or h. identifying said macro cell as a relative precise macro cell if said pointing device is determined to be in a second axis area and said first coordinate can be determined, or identifying said macro cell as a coarse macro cell with a macro cell number if said pointing device is determined to be in a second axis area and said first coordinate can not be determined.

3. The method as claimed in claim 1, wherein said step d. includes using threshold values for determining if said pointing device is located in a first axis edge area or a second axis edge area, said threshold values depending on environment noise, distance between the surface of said digitizer tablet apparatus to detectable location of said pointing device.

4. The method as claimed in claim 1, wherein said step d. includes using threshold values for determining if said pointing device is located in a first axis edge area, said threshold values depending on the width of said first axis edge area.

5. The method as claimed in claim 1, wherein said step d. includes using threshold values for determining if said pointing device is located in a second axis edge area, said threshold values depending on the width of said second axis edge area.

* * * * *